Oct. 8, 1935.  P. R. LEHOTA  2,016,640
WEED AND PLANT PULLER
Filed May 3, 1935
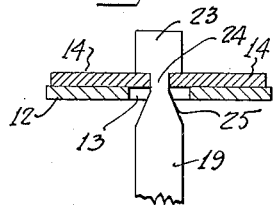
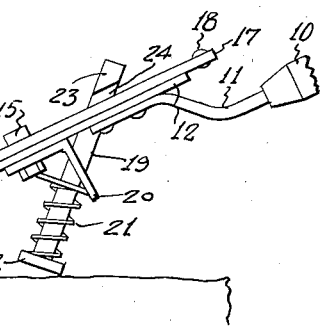
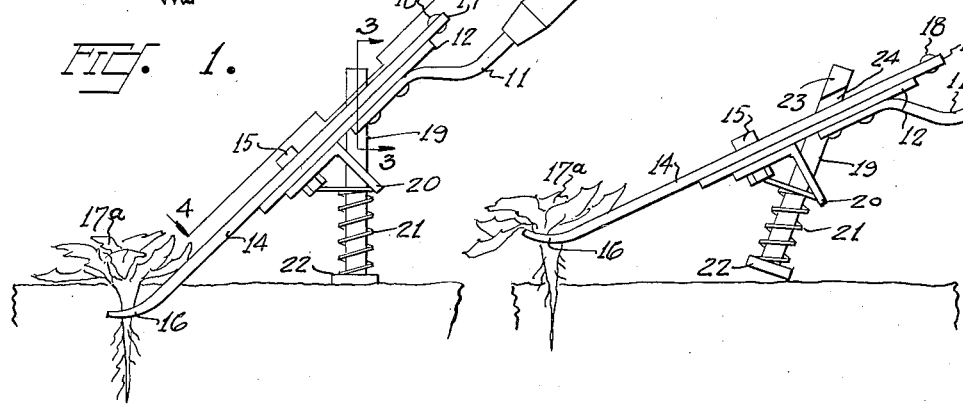
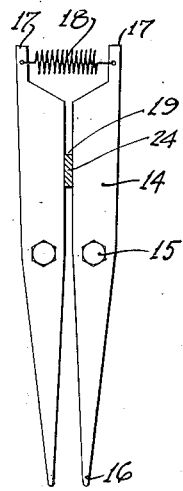
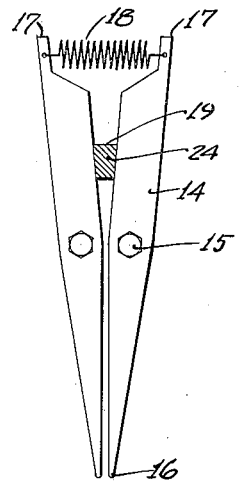
INVENTOR
Paul Ross Lehota.
BY G.E. Hamaker
ATTORNEY Patented Oct. 8, 1935

2,016,640

UNITED STATES PATENT OFFICE 2,016,640

WEED AND PLANT PULLER

Paul Ross Lehota, Portland, Oreg.

Application May 3, 1935, Serial No. 19,687

2 Claims. (Cl. 55—68)

My invention relates to a device whereby its use will pull weeds and small plants from the soil in which they are growing. This device is so constructed that by pressure exerted on the handle of the implement will cause a pair of jaws to close upon the roots of the weed or plant to be pulled and thereafter by further pressure exerted upon the handle, the weed with its roots will be extracted from the soil.

The object of my invention is to construct a pair of jaws pivot bolted flush to a plate and attached together by a spring at the upper end of the jaws, and separated, at a point between the spring and bolts, by a tapered bar affixed through the plate in a position at approximately a 45 degree angle with the plate and jaws, and so designed by the tapered bevel of this vertical bar that its upward movement and passage between the jaws will tend to widen the upper part of the jaws and close the lower, or gripping portion of the jaws.

I obtained these objects in the manner illustrated in the accompanying drawing and set forth in the specifications following:

Referring to the drawing: Figure 1 is the side elevation showing the device in use; Figure 2 is the side elevation showing the weed puller's position when the weed has been lifted; Figure 3 is the section 3—3 in Figure 1; Figure 4 is the section 4—4 in Figure 1; Figure 5 is the section 4—4 in Figure 1 showing the jaws in gripping position.

No. 10 is the handle of the implement; 11 is the handle connection; 12 is the assembly plate; 13 is the opening in the assembly plate; 14 is the jaws; 15 is the pivot bolts; 16 is the jaw points; 17 is the upper ends of the jaws; 17a is the weed to be pulled; 18 is the jaw spring; 19 is the jaw-closing bar; 20 is the closing bar guide; 21 is the closing bar spring; 22 is the closing bar foot; 23 is the upper end of the jaw-closing bar; 24 is the top of the tapered portion of the jaw-closing bar; 25 is the body or shank of the tapered portion of the jaw-closing bar.

The assembly plate 12 is constructed with a connection 11 with the handle 10. At the lower portion of 12 is a guide bracket 20 through which the pivot bolts 15 are fixed. Between the guide bracket 20 and the upper end of the assembly plate 12 is an opening 13. To the assembly plate 12 are pivoted the jaws 14 by means of the pivot bolts 15. The pivot bolts 15 permit free lateral motion of the jaws 14. The upper end of the jaws 17 are connected by the jaw spring 18. Through the opening 13 in the assembly plate 12 is situated the jaw-closing bar 19. At the lower end of this closing bar 19 is the foot 22 which affords a fulcrum for the implement at the level of the ground. The upper end of the closing bar 23 is larger than the tapered portions of the closing bars 24 and 25. Between the closing bar guide 20 and the foot 22 is the closing bar spring which affords the return of the jaw closing bar to its original position.

When my device constructed by the foregoing parts and shown in my drawings is in its normal position, the jaw points 16 are extended as shown in Figure 4. These jaw points 16 in this extended position may be inserted in the soil on each side of the weed root 17a, and the jaw closing bar 19 will be held in a lowered position by its own weight or the pressure of the bar spring 21 such that tapered portion of the closing bar 25 will be on the under side of the jaws 14. Upon the application of pressure on the handle 10, the jaw-closing bar 19 moves in an upward direction as shown in Figure 2. This pressure causes the tapered portion of the jaw-closing bar 19 to engage and to pass between the jaws 14, thereby opening the upper ends of the jaws 14 and closing the jaw points 16 upon the weed root 17a. This position of the jaws 14, jaw points 16 and tapered portion of the jaw-closing bar 24 is shown in Figure 5. Further pressure on the handle 10 causes the device to function as a simple lever with pressure on the handle 10, fulcrum at the foot 22 and weight at the jaw points 16, thus lifting the weed and roots 17a from the ground.

What I claim as new and desire to protect by Letters Patent of the United States is:

1. In a weed and plant puller, the combination of a handle and a handle connection, to which is affixed an assembly plate with a pair of jaws pivot-bolted flush thereon, which jaws are joined at the ends in nearest proximity to the handle shaft by a spring; and are separated at a place between the spring and the pivot bolts by a bar, vertical in position, with assembly plate and jaws, tapered from the front to back and from top to bottom, said bar having free movable access through said assembly plate and between said jaws, substantially as described.

2. In a weed and plant puller, the combination of a handle and handle connection, to which is affixed an assembly plate with a pair of jaws pivot-bolted flush thereon, which jaws are joined at the ends in nearest proximity to the handle connection by a spring and are separated by a bar vertical in position with the assembly plate and jaws, said bar being tapered from front to back and from top to bottom, having free movable access through the assembly plate, and between the jaws and provided with a spring around and about its lower portion, extending from the assembly plate to the foot of the said vertical bar, substantially as described.

PAUL ROSS LEHOTA.